June 23, 1925.
J. H. HAMMOND, JR
1,542,937
OPTICAL INSTRUMENT
Original Filed May 8, 1920
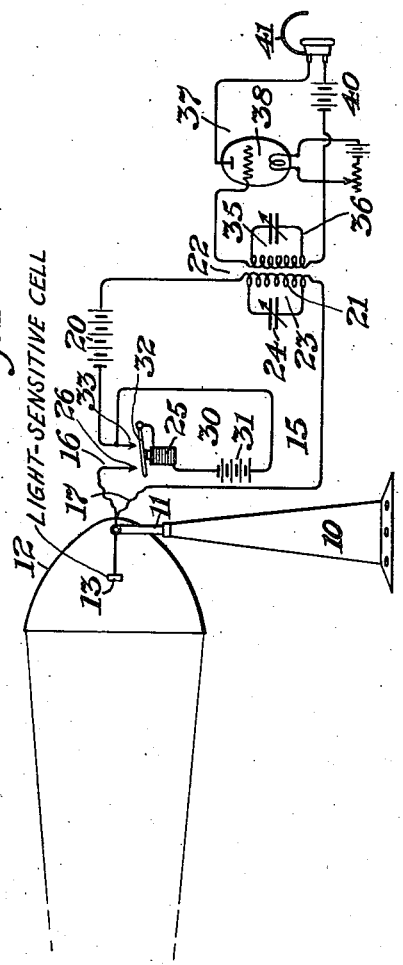
INVENTOR
John Hays Hammond Jr.
BY
A. J. Gardner
ATTORNEY Patented June 23, 1925.

1,542,937

UNITED STATES PATENT OFFICE.

JOHN HAYS HAMMOND, JR., OF GLOUCESTER, MASSACHUSETTS.

OPTICAL INSTRUMENT.

Application filed May 8, 1920. Serial No. 379,840.

*To all whom it may concern:*

Be it known that I, JOHN HAYS HAMMOND, Jr., a citizen of the United States, and a resident of Gloucester, county of Essex, and State of Massachusetts, and whose post-office address is Hammond Radio Research Laboratory, Gloucester, Massachusetts, have invented certain new and useful Improvements in Optical Instruments, of which the following is a specification.

Some of the objects of the present invention are to provide means for detecting objects in the dark, or in fogs, or subject to other conditions, wherein the objects are invisible to the human eye; to provide means for locating the approximate position of a vessel or any other object which is invisible to the human eye; to provide means for determining the approximate shape of an object invisible to the human eye; to provide an instrument sensitive to the infra red rays of the spectrum and means for detecting variations in the intensity of the rays received by such instrument; and to provide other improvements as will hereinafter appear.

In the accompanying drawings Fig. 1 represents a side elevation, partly in section, of one form of an optical instrument embodying the present invention, together with a diagram of electrical circuits controlled by said instrument; Fig. 2 represents an object, such as a submarine or vessel, in darkness or fog which is to be detected; and Fig. 3 is a graphic illustration of the observed object whereby the approximate shape of the object can be determined.

Referring to the drawings one form of the present invention is shown comprising a standard 10 having a universal joint 11 arranged to support a mirror 12, which is preferably of parabolic form to focus all received light rays upon a receiver 13. This receiver 13 is adjustably mounted in any suitable manner for movement along the axis of the mirror 12 and is a type of receiver which is sensitive to the infra red rays of the spectrum, that is waves longer than those affecting the human eye. In the present instance the receiver 13 is shown as a selenium cell, though the invention is not limited to that particular type of receiver as obviously a thermo-couple or any other light sensitive device suitable for the purpose may be employed.

In Figure 2 an object 14 in the form of a vessel normally invisible to the human eye, because of a fog or the like, is shown traversing the field of light rays collected by the mirror 12.

For the purpose of detecting the presence of the object 14 by means of the mirror 12, the selenium cell 13 is included in a controlled circuit 15 comprising conductors 16 and 17 leading from the selenium cell 13, a battery 20, and a primary coil 21 of a transformer 22. The coil 21 is also included in a tuned circuit 23 having a variable condenser 24. At a suitable location in the circuit 15 an interrupter 25 is connected in a manner to make and break the circuit 15 at a terminal 26. This interrupter 25 may be of any type suitable for the purpose but is here shown as a well known form of electric buzzer connected in a buzzer circuit 30 and energized by a battery 31. The buzzer 25 is arranged to actuate an armature 32 which makes and breaks the controlled circuit 15 through the terminal contact 26, and the buzzer circuit 30 through a terminal contact 33. The secondary coil 34 of the transformer 22 is in a tuned circuit 35 having a condenser 36, and the circuit 35 is arranged to control an amplifying circuit 37 including an audion 38 of any well known type, a battery 40 and a telephone receiver 41 or any other suitable device for detecting the received energy. The circuits 23 and 35 are respectively tuned by the condensers 24 and 36 to the frequency of interruption of the current by the buzzer 25.

In the operation of this form of the invention the mirror 12 is moved about its axis in order to receive energy from the different directions from what to a human eye is uniform darkness or uniform illumination. Where this light condition is actually uniform the resistance of the receiver 13 will also be uniform and, consequently, there will be a note of uniform intensity given by the telephone receiver 41. When, however, an object 14, such as a ship, intercepts the beams of energy within the range of the reflector or mirror 12, then there is a slight change in the intensity of the energy received by the receiver 13, which, in this instance, responds by a variation in the resistance of the circuit 15 and causes the intensity of the note in the telephone to be changed, whereby the presence of the object is detected. Owing to the concentration of the received energy upon the receiver by the mirror 12 and the amplification by the audion 38 the receiving system is far more sensitive than the human eye for changes of illumination and is also sensitive to illumination by the infra red rays of the spectrum.

In order to determine the approximate shape of the object within the range of the instrument, the mirror 12 can be moved horizontally about its vertical axis thereby sweeping the object from end to end to ascertain the approximate length. Also by swinging the mirror 12 vertically about its horizontal axis at different orientations the contour of the object can be outlined as indicated in Fig. 3, and thus an approximation of the actual shape of the object can be made.

While but one form of receiver had been described it will be apparent that this may be modified in many ways without departing from the invention, for example a thermocouple may be readily used in place of the selenium cell and variations of the electromotive force utilized to indicate in the telephone receiver a change in the concentrated light beams. Where such a thermo-couple is used it may not be necessary to use a separate source of current such as the battery 20. Also a cell formed of thallium oxo-sulphide may be employed as the light sensitive element, and for purposes of amplification connected in the grid circuit of the amplifier. Furthermore the invention is not limited to a single audion or amplifying device, as there may be a plurality of amplifiers to further increase the audibility of the receiving circuit.

Having thus fully described my invention what I claim is:—

1. In an optical instrument, a receiver thallium oxo-sulphide cell sensitive to light waves, and means actuated by said receiver for detecting variations in the intensity of said light waves.

2. In a light receiving system, the combination with an electrical circuit, including a cell sensitive to infra red light rays, a source of electrical energy, an interrupter, and an inductance, a condenser shunted around said inductance and forming therewith a closed oscillatory circuit tuned to the frequency of said interrupter, and a telephone receiver operatively connected to said first mentioned circuit.

3. In a light receiving system, the combination with an electrical circuit, including a cell sensitive to infra red light rays, a source of electrical energy, an interrupter, and an inductance, a condenser shunted around said inductance and forming therewith a closed oscillatory circuit tuned to the frequency of said interrupter, a second closed oscillatory circuit tuned to said frequency and inductively coupled to said first mentioned closed oscillatory circuit, an amplifier of electric impulses controlled by said second mentioned closed oscillatory circuit, and a telephone receiver controlled by said amplifier.

4. In a light receiving system, the combination with an electrical circuit, including a thallium oxo-sulphide cell sensitive to infra red light rays, a source of electric energy, an interrupter, and an inductance, a condenser shunted around said inductance and forming therewith a closed oscillatory circuit tuned to the frequency of said interrupter, and a telephone receiver operatively connected to said first mentioned circuit.

5. In a light receiving system, the combination with an electrical circuit, including a thallium oxo-sulphide cell sensitive to infra red light rays, a source of electrical energy, an interrupter, and an inductance, a condenser shunted around said inductance and forming therewith a closed oscillatory circuit tuned to the frequency of said interrupter, a second closed oscillatory circuit tuned to said frequency and inductively coupled to said first mentioned closed oscillatory circuit, an amplifier of electrical impulses controlled by said first mentioned closed oscillatory circuit, and a telephone receiver controlled by said amplifier.

6. In a receiving system for energy having a form to which the bodily senses are inert, the combination with a thallium oxo-sulphide cell, of a signal device to which one of the bodily senses responds, and means controlled by said cell for variably actuating said device.

7. In a receiving system for energy having a form to which the bodily senses are inert, the combination with a thallium oxo-sulphide cell, of a signal device for producing manifestations of energy to which one of the bodily senses responds, and means controlled by said cell for variably actuating said device.

Signed at New York in the county of New York and State of New York this 7th day of May A. D. 1920.

JOHN HAYS HAMMOND, Jr.